H. R. PENNINGTON.
METHOD OF RIVETING.
APPLICATION FILED OCT. 19, 1918.

1,346,054.

Patented July 6, 1920.

WITNESS:
George T. Breisch

INVENTOR.
Harry R. Pennington
BY
ATTORNEY.

UNITED STATES PATENT OFFICE.

HARRY R. PENNINGTON, OF KANSAS CITY, MISSOURI, ASSIGNOR TO U. S. LIGHT & HEAT CORPORATION, OF NIAGARA FALLS, NEW YORK, A CORPORATION OF NEW YORK.

METHOD OF RIVETING.

1,346,054.  Specification of Letters Patent.  Patented July 6, 1920.

Application filed October 19, 1918. Serial No. 258,806.

*To all whom it may concern:*

Be it known that I, HARRY R. PENNINGTON, a citizen of the United States, residing at Kansas City, in the county of Jackson and State of Missouri, have invented new and useful Improvements in Methods of Riveting, of which the following is a specification.

The present invention relates to methods of riveting.

More particularly the present invention relates to methods for joining two members together by riveting, whereby the old process of peening over the end of a rivet by means of a hammer or other tool, may be dispensed with.

An object of the present invention is to provide an improved method of riveting, whereby the labor and expense will be reduced to a minimum.

A further object is to provide an improved method of riveting whereby an electric arc may be employed to build up a riveted construction.

Further objects will be apparent as the description proceeds.

Referring to the drawings:—

Figure 1:
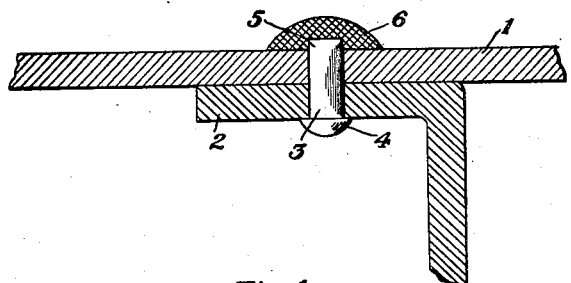
Figure 1 represents two members which have been riveted together by a method according to applicant's invention.

The numerals 1 and 2 represent two members which are to be riveted together, said members 1 and 2 being provided with alined holes through which extends a rivet 3. The end 4 of said rivet 3, according to the method illustrated in Fig. 1, will lie preferably in contact with the member 2, while the other end 5 of said rivet will extend a short distance beyond the opposite side of member 1. An operator will play upon the end 5 of the rivet 3 by means of an electric arc, thereby heating said rivet 3 and causing elongation thereof. Preferably, the operator will use a metallic electrode and will deposit metal from said electrode upon and around the end 5 of the rivet 3, thereby building up the head 6. When said rivet cools, it will contract, whereby to hold the members 1 and 2 in intimate contact with one another.

Figure 2:
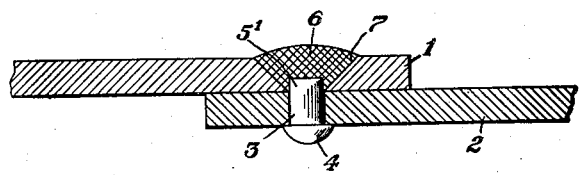
Fig. 2 shows a riveted construction illustrating a modification of the method employed in Fig. 1.

According to the method as illustrated in Fig. 2, the member 1 is provided with a tapered hole, the wall of which is indicated by the numeral 7. According to Fig. 2 a shorter rivet may be used, the end 5' thereof extending only part way through the member 1. As in Fig. 1, the operator will play upon the end of the rivet, causing the elongation thereof, and will deposit metal upon and around the end of the rivet, filling up the hole bounded by the tapered wall 7. The fact that the rivet extends beyond the abutting surface of the two members 1 and 2, will be of advantage in resisting shearing stresses between said members.

The invention illustrated in either Fig. 1 or Fig. 2 will result in a tight connection between the members 1 and 2 and will involve considerably less skill than is involved in the mode of riveting now in general practice.

The described embodiments of the present invention are chosen merely for the purpose of illustration and should not be construed in a limiting sense. Many modifications will occur to those skilled in the art. It is intended in this patent to cover all such modifications that come within the scope of the invention as defined by the appended claims.

What I claim as new and desire to secure by Letters Patent of the United States is—

1. A method of riveting which consists in placing a rivet in riveting position, heating said rivet by local application of an electric arc, and depositing metal upon and around said rivet in close proximity to one of said members.

2. A method of riveting which consists in providing two members to be joined with alined holes, inserting a rivet in said holes, drawing an electric arc between said rivet and an electrode, and depositing metal upon and around said rivet in close proximity to one of said members.

3. A method of riveting which consists in providing two members to be joined with alined holes, inserting a rivet within said holes, heating said rivet by drawing an electric arc between same and a metallic electrode and depositing metal from said electrode upon and around said rivet.

4. The method of riveting which consists in heating a rivet and building up a head for said rivet after same has been placed in riveting position by depositing metal thereon, whereby, upon cooling, said rivet will contract to provide a tight connection.

5. The method of riveting which consists in heating a rivet after same has been placed in riveting position and building up a head therefor by depositing metal thereon, whereby, upon cooling, said rivet will contract to provide a tight connection.

6. The method of riveting which consists in heating a rivet and building up a head for said rivet after same has been placed in riveting position by striking an arc between said rivet and a metallic electrode.

7. The method of riveting which consists in heating a rivet after same has been placed in riveting position by striking an arc between said rivet and a metallic electrode and building up a head for said rivet by depositing metal from said electrode.

In witness whereof, I have hereunto subscribed my name.

HARRY R. PENNINGTON.